United States Patent
Rommel et al.

(10) Patent No.: US 12,003,428 B2
(45) Date of Patent: Jun. 4, 2024

(54) MULTI-CLOUD RESOURCE SCHEDULER

(71) Applicant: SAP SE, Walldorf (DE)

(72) Inventors: Roman Rommel, Neustadt an der Weinstrasse (DE); Philipp Knuesel, Nussloch (DE); Janick Frasch, Heidelberg (DE); Santo Bianchino, Schifferstadt (DE)

(73) Assignee: SAP SE, Walldorf (DE)

( * ) Notice: Subject to any disclaimer, the term of this patent is extended or adjusted under 35 U.S.C. 154(b) by 361 days.

(21) Appl. No.: 17/477,807

(22) Filed: Sep. 17, 2021

(65) Prior Publication Data

US 2023/0091954 A1    Mar. 23, 2023

(51) Int. Cl.
| | | |
|---|---|---|
| *H04L 47/70* | (2022.01) | |
| *G06F 9/48* | (2006.01) | |
| *H04L 9/40* | (2022.01) | |
| *H04L 41/22* | (2022.01) | |

(52) U.S. Cl.
CPC ......... *H04L 47/827* (2013.01); *G06F 9/4887* (2013.01); *H04L 41/22* (2013.01); *H04L 47/826* (2013.01); *H04L 63/108* (2013.01)

(58) Field of Classification Search
CPC ..... H04L 47/827; H04L 47/826; H04L 41/22; H04L 63/108; G06F 9/4887
See application file for complete search history.

(56) References Cited

U.S. PATENT DOCUMENTS

| | | | |
|---|---|---|---|
| 6,411,605 B1 * | 6/2002 | Vance | H04M 3/565 370/356 |
| 9,514,110 B2 | 12/2016 | Kuchibhotla et al. | |
| 10,498,665 B1 | 12/2019 | Meck et al. | |
| 10,749,813 B1 * | 8/2020 | Zhao | H04L 47/822 |
| 10,861,453 B1 * | 12/2020 | Chadha | G10L 15/1815 |
| 11,138,567 B1 * | 10/2021 | Schmoldt | G06Q 10/06393 |
| 11,656,912 B1 * | 5/2023 | Burgin | G06F 9/5022 718/105 |
| 2010/0036641 A1 | 2/2010 | Lee et al. | |

(Continued)

OTHER PUBLICATIONS

"European Application Serial No. 22153853.1, Extended European Search Report mailed Jun. 30, 2022", 10 pgs.

(Continued)

*Primary Examiner* — John A Follansbee
*Assistant Examiner* — Zonghua Du
(74) *Attorney, Agent, or Firm* — SCHWEGMAN LUNDBERG & WOESSNER, P.A.

(57) ABSTRACT

Computer-readable media, methods, and systems are disclosed for scheduling a start time and a shutdown time of one or more online resources associated with a multi-cloud resource scheduler. A request from a first user is received to access a multi-cloud resource scheduler associated with one or more online resources. Responsive to the request from the first user, credentials of the first user are validated prior to providing access to the multi-cloud resource scheduler. Based upon validating the credentials of the first user, access to the multi-cloud resource scheduler is provided. Instructions are received from the first user to schedule a start time and a shutdown time of at least one online cloud resource connected to the multi-cloud resource scheduler. An availability of the at least one online cloud resource is established for access by a second user based on the instructions.

19 Claims, 6 Drawing Sheets

(56) References Cited

U.S. PATENT DOCUMENTS

| | | | |
|---|---|---|---|
| 2012/0054623 A1* | 3/2012 | Guan | G06Q 10/109 |
| | | | 708/111 |
| 2016/0308786 A1* | 10/2016 | Chen | H04L 47/826 |
| 2017/0083871 A1 | 3/2017 | Chang et al. | |
| 2017/0195247 A1* | 7/2017 | Tao | H04L 47/83 |
| 2019/0026148 A1* | 1/2019 | Hammond | G06Q 10/06 |
| 2019/0140933 A1* | 5/2019 | Guim Bernat | H04L 47/2425 |
| 2020/0183750 A1* | 6/2020 | Abdelsalam | G06F 9/5077 |
| 2020/0342416 A1* | 10/2020 | Bregman | G06F 9/5072 |
| 2020/0382437 A1* | 12/2020 | Srinivasan | G06N 5/04 |
| 2021/0021538 A1* | 1/2021 | Meck | H04L 67/02 |

OTHER PUBLICATIONS

Olaniyan, Richard, "Multipoint Synchronization for Fog-Controlled Internet of Things", IEEE Internet of Things Journal, vol. 6, No. 6, (Dec. 2019), 9656-9667.

"European Application Serial No. 22153853.1, Communication Pursuant to Article 94(3) EPC, mailed Feb. 20, 2024", 8 pgs.

* cited by examiner

MULTI-CLOUD RESOURCE SCHEDULER

TECHNICAL FIELD

Embodiments of the present teachings provide a system and method of using a multi-cloud resource scheduler for establishing start and shutdown times for cloud-based services and resources.

With cloud-based services and platforms becoming more widespread in all industries, businesses are investing more resources on cloud-based services and platforms, such as Microsoft Azure, Amazon Web Services ("AWS"), and the Google Cloud Platform. Oftentimes, businesses are paying for 24/7 access for these services that charge per minute for access, while a majority of users are only using the services during standard business hours. Accordingly, there is a significant loss for business in paying for constant access of the services.

Accordingly, what is needed is a system and method of selectively making cloud-based services and platforms available for users when needed, but which also allows for the scheduling of shutting the resources down during non-prime hours. Furthermore, a need also exists for a system and method of providing to administrators and engineers one entry point providing an overview of all services running on different hyperscalers.

SUMMARY

Embodiments solve the above-mentioned problems by providing systems, methods, and computer-readable media for establishing pre-determined start times, shutdown times, and schedules of cloud-based hyperscale instances. In some embodiments, individual user's use and needs may be taken into account, providing for granularity and particularized availability of the hyperscale instances, while maintaining the integrity of the platform at a macro level.

Embodiments are directed to systems and methods for scheduling a start time and a shutdown time of one or more online resources associated with a multi-cloud resource scheduler, the method comprising: receiving, a request from a first user to access a multi-cloud resource scheduler, wherein the multi-cloud resource scheduler is connected to one or more online resources, responsive to the request from the user, validating credentials of the first user to access the multi-cloud resource scheduler, based upon the validating of the credentials of the first user, providing, to the first user, access to the multi-cloud resource scheduler, receiving instructions from the first user to schedule the start time and the shutdown time of at least one online cloud resource associated with the multi-cloud resource scheduler, and based on the instructions, establishing an availability of the at least one online cloud resource for access by a second user.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
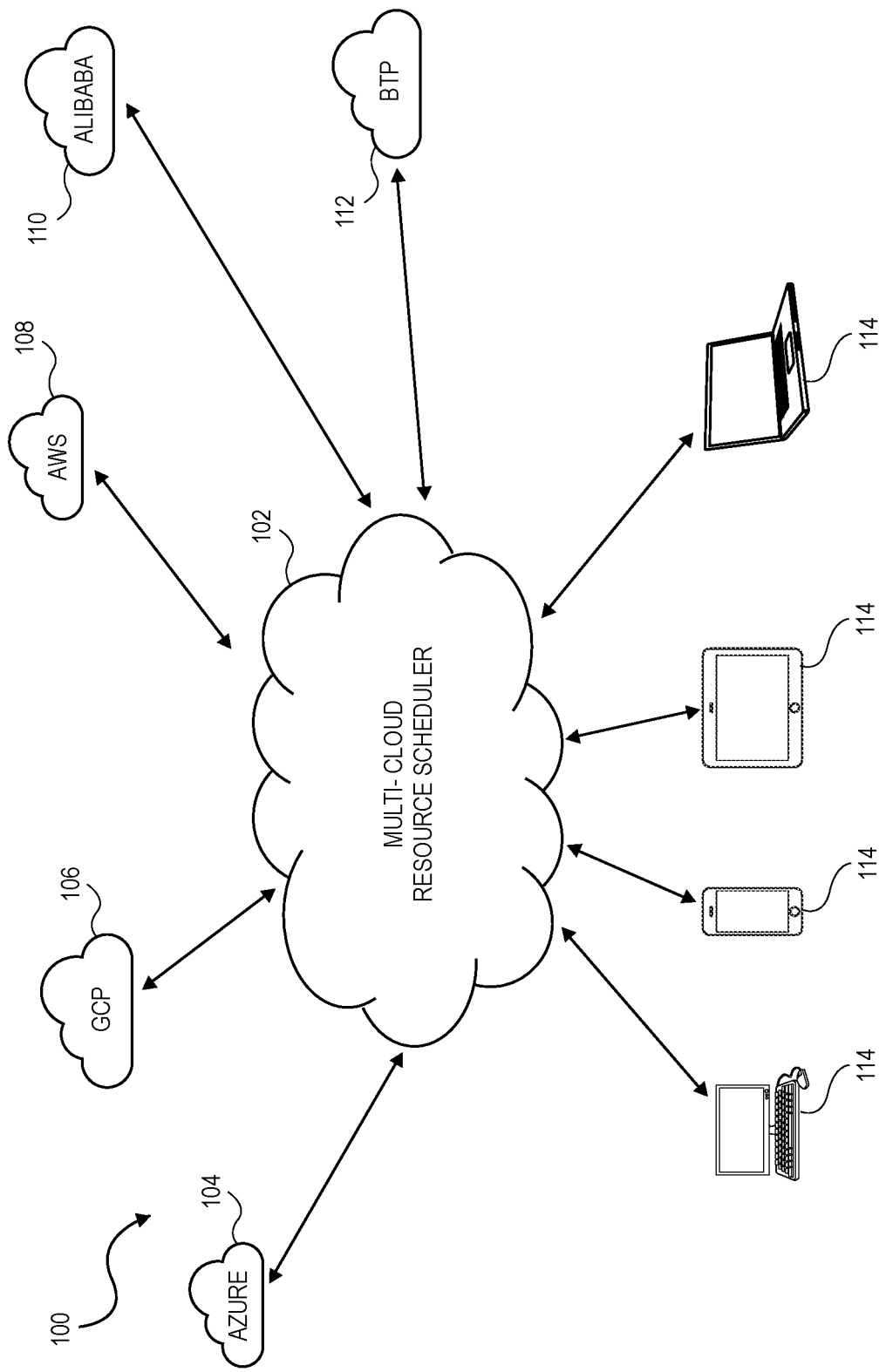
FIG. 1 is a system diagram illustrating a multi-cloud resource scheduler coupled to a plurality of hyperscaler instances and client devices for certain embodiments.

The drawing figures do not limit the disclosure to the specific embodiments disclosed and described herein. The drawings are not necessarily to scale, emphasis instead being placed upon clearly illustrating the principles of the disclosure.

DETAILED DESCRIPTION

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

The subject matter of the present disclosure is described in detail below to meet statutory requirements; however, the description itself is not intended to limit the scope of the claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering.

Broadly, embodiments of the present teaching provide for methods, systems, and computer-executable instructions that, when executed by a processor perform a method of establishing start and shutdown times for cloud-based instances. Administrators or credentialed users can establish the start and shutdown time for the cloud-based instances, to maintain optimal availability of the instances to other users, while avoiding unnecessary overhead costs associated with running the cloud-based instances 24/7, when no or few users are accessing the instances. In some embodiments, individual user's hardware or software may be accessed for making determinations on an individual level whether users should be granted exceptions to access the instances during scheduled shutdown times.

Turning now to the figures, FIG. 1 illustrates an exemplary system of embodiments of the present teachings referenced generally by reference numeral 100. In some embodiments, system 100 comprises a multi-cloud resource scheduler 102. In some embodiments, multi-cloud resource scheduler 102 may be an application or application programming interface (API) for the managing of one or more hyperscaler instances or other online resources or services. As described in greater details below, in some embodiments, multi-cloud resource scheduler 102 may only be accessible by administrators or other users having pre-approved credentials or authority. Users with the authority to access multi-cloud resource scheduler 102 may then establish the accessibility and/or availability of one or more instances, 104, 106, 108, 110, and 112 connected or associated with multi-cloud resource scheduler 102. As used herein, "instances" refers to virtual machines, including servers, databases, or other types of online resources. Some examples of commonly used instances include, but are not limited to: Microsoft Azure 104, Google Cloud 106, AWS 108, Alibaba Cloud 110, and SAP Business Technology Platform (BTP) 112. In some embodiments, instances 104, 106, 108, 110, 112 may be hyperscaler resources, wherein the instances are applied in massive scale computing, accessible for a plurality of users. As illustrated, multi-cloud resource scheduler 102 may be communicatively coupled to instances 104, 106, 108, 110, and 112. It will be appreciated that multi-cloud resource scheduler 102 may be communicatively coupled to any number of instances, and that the number of instances is not a limiting feature of the present teachings. Furthermore, the present teachings are not limited only to instances or even to hyperscaler instances, and multi-cloud resource scheduler 102 may be used to schedule any online service, platform, or resource.

In some embodiments, multi-cloud resource scheduler 102 may be used to communicatively connect to instances 104, 106, 108, 110, and/or 112 allowing administrators or other users to define the availability of instances 104, 106, 108, 110, and/or 112 for other users. For example, an administrator of a company may access multi-cloud resource scheduler 102 and define a schedule of availability that employees of the company may access instances 104, 106, 108, 110, and/or 112. Administrators may access instances 104, 106, 108, 110, and 112 via client devices 114 connected to multi-cloud resource scheduler 102. Client devices 114 may be communicatively connected to multi-cloud resource scheduler 102 and for example, may be desktop computers, laptop computers, smart phones, and tablets. Instances 104, 106, 108, 110, and/or 112 may then be accessible by one or more end-users, with the end-users accessing instances 104, 106, 108, 110 and/or 112 through a client device.

Figure 2:
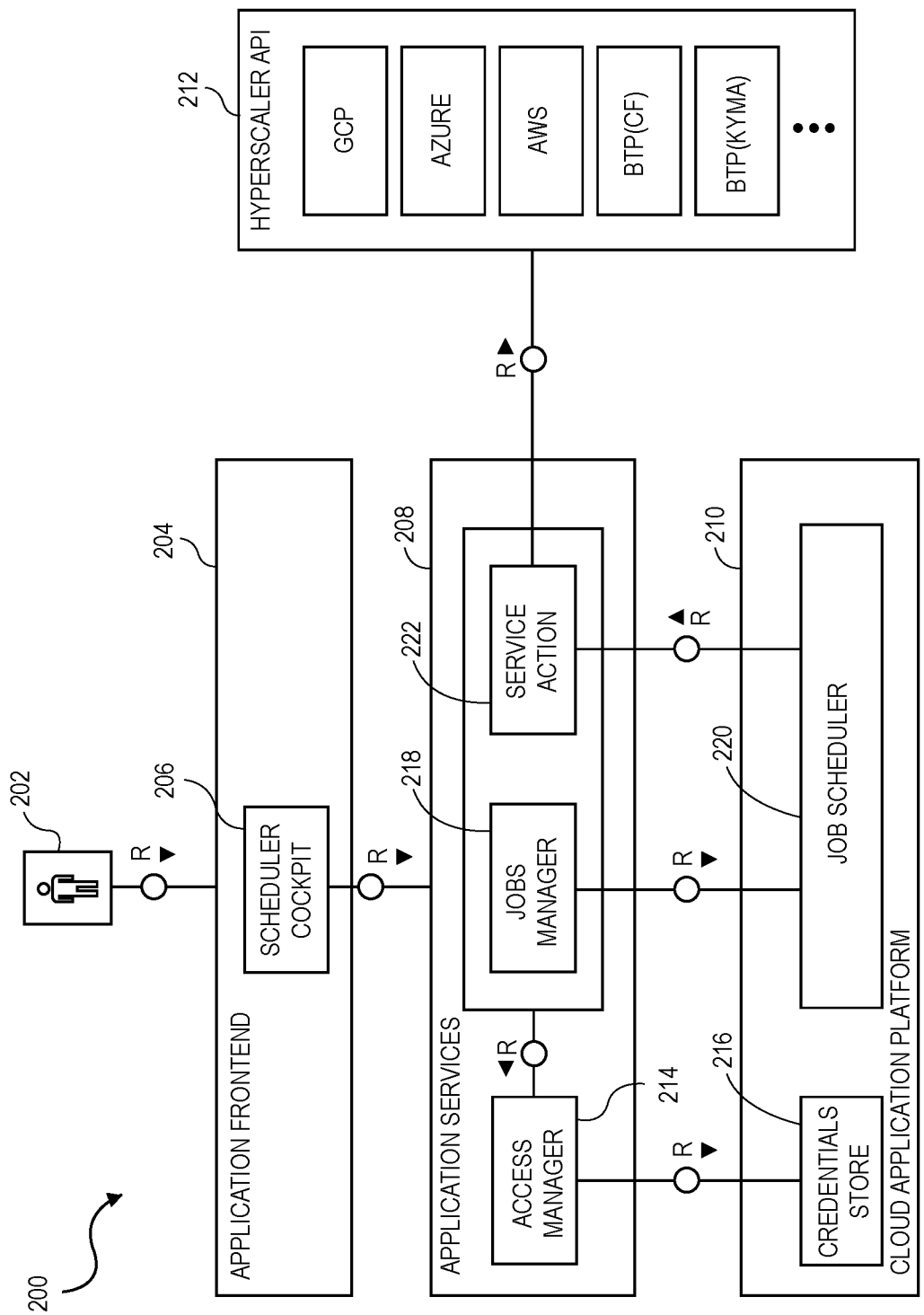
FIG. 2 is a system diagram illustrating an example system architecture for the certain embodiments.

Turning now to FIG. 2, a system diagram illustrating an exemplary system architecture relating to some embodiments is depicted and referred to generally by reference numeral 200. In some embodiments, system 200 is accessible by an administrator 202, or alternatively through an automated means, for accessing an application frontend 204 of multi-cloud resource scheduler 102. Administrator 202 may be an administrator, senior engineer, or other user having credentials to schedule start and stop (also referred to as shutdown) times of instances. In some embodiments, application frontend 204 may comprise a scheduler cockpit 206. Scheduler cockpit 206 may be a dashboard or graphical user interface of application frontend 204, accessible to administrator 202 through a client device. Through scheduler cockpit 206, the administrator 202 may input commands or instructions for managing and using multi-cloud resource scheduler 102.

In some embodiments, application frontend 204 may further communicatively connect with a system API 208. System API 208 may be an API in communication with application frontend 204 and may be configured for communicating with a cloud application platform 210 and/or a hyperscaler API 212. In some embodiments, system 200 may only be accessible by administrators or other users having pre-approved authority or credentials to access system API, and to start or stop instances. Accordingly, in some embodiments, system 200 may be configured to have a security feature for checking the credentials of users or administrators attempting to access system 200. For example, in some embodiments, system API 208 may comprise an access manager 214, configured for accessing the credentials of administrators or users. In some embodiments, and as described in greater detail below, a credential check of an administrator or other user may comprise a review of a JSON Web Token or other credential token associated with the administrator or other user. In some embodiments, the JSON Web Token or other credential token may contain information related to what an administrator or other user is authorized to do. In some embodiments, additional credential checks may occur. For example, a credential check of an administrator or other user may comprise access manager 214 calling out to a credentials store 216. Credentials store 216 may be a service associated with a cloud provider for a particular online service or instance for storing credentials.

In some embodiments, system API 208 may further comprise a jobs manager 218 for scheduling start times and shutdown times of one or more instances. In some embodiments, and as described in greater detail below, jobs manager 218 may call out to a job scheduler 220 for the scheduling of start times and shutdown times for one or more instances, providing the schedule of availability of the instances to one or more users. In some embodiments, job scheduler 220 may be associated with cloud application platform 210. Job scheduler 220 may be a service associated with a hyperscaler, and which may send requests to hyperscaler API 212 for starting and stopping instances. which is available on all hyperscalers. Through the connection between jobs manager 218 and job scheduler 220, instructions for starting and stopping one or more instances may be sent to hyperscaler API 212. Job scheduler 220 may further connect to and send instructions via a http call to trigger actions like starting or stopping instances, cloud resources, or other services, to a service action 222 running on hyperscaler API 212 with system API 208. Service action 222 may be configured to call out to and send the inputted instructions to hyperscaler API 212. In some embodiments, hyperscaler API 212 may be the interface used to schedule start and stop times of instances, cloud resources and/or services. In some embodiments, hyperscaler API 212 may be used to schedule the start and stop times of a plurality of instances, cloud resources, and/or services. In some embodiments, instances may be added to or removed from Hyperscaler API 212, allowing for flexibility in the scheduling of start and shutdown times of instances.

Figure 3:
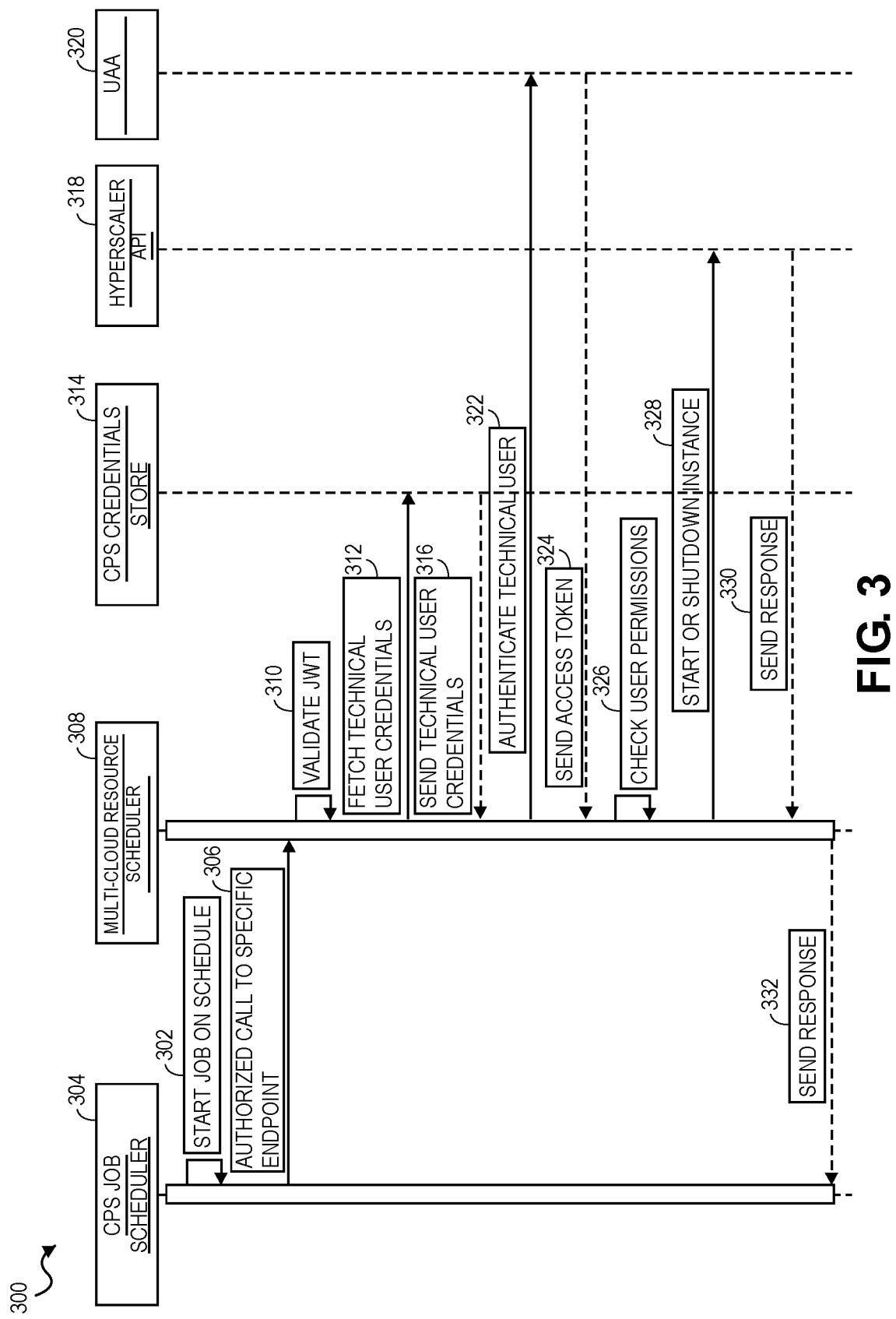
FIG. 3, is a swim lane diagram of an example architecture in connection with certain embodiments

Turning now to FIG. 3, a swim lane diagram illustrating exemplary steps of carrying out embodiments of the present teachings is depicted and referred to generally with reference numeral 300. However, it should be understood that, in some embodiments, various alternative flows are also contemplated. First, at step 302, a user may start a job for scheduling a start time, shutdown time, and/or schedule of one or more instances. In some embodiments, the user may be an administrator, senior engineer, or other user having pre-approved credentials for starting and stopping instances. The instances may be any of the instances referred to above with respect to either of FIG. 1 or FIG. 2. In some embodiments, the user may start the job at a cloud provider services (CPS) job scheduler 304. CPS job scheduler 304 may be a service associated with one or more instances and may be configured for triggering start and stop requests at preselected times. Next, at a step 306, CPS job scheduler 304 may call out to a specific endpoint, which in some embodiments, the specific endpoint may be a multi-cloud resource scheduler 308. In some embodiments, multi-cloud resource scheduler 308 may be multi-cloud resource scheduler 102 as described above with respect to FIG. 1 or other scheduling services for cloud-based resources.

In some embodiments, multi-cloud resource scheduler 308 may schedule the availability of at least one instance for one or more users accessing the instance. Accordingly, prior to scheduling the availability of an instance, authentication of the user responsible for the instructions of scheduling the availability of an instance may act a safeguard to prevent non-approved users from scheduling the availability of instances. In some embodiments, only administrators, senior engineers, or other preapproved uses may schedule the availability of the instances. In some embodiments, responsive to CPS job scheduler 304 calling out to multi-cloud resource scheduler 308, step 310 may take place. At step 310, multi-cloud resource scheduler 308 may validate the credentials of the user accessing the multi-cloud resource scheduler 308. In some embodiments, there may be a single security or credential check, or multiple security or credential checks. For example, the user requesting to access multi-cloud resource scheduler 308 may be accompanied with a token or other security tag, such as a JSON Web Token (JWT) that may be validated. In some embodiments, at step 310, an initial credential check may comprise a validation of the JWT or other security tag associated with the user.

In some embodiments, further validation of the user's credentials may take place. For example, at a next step 312, multi-cloud resource scheduler 308 may fetch additional credentials associated with the user. In some embodiments, multi-cloud resource scheduler 308 may call out to a CPS credentials store 314. CPS credentials store 314 may be a credentials service in communication with multi-cloud resource scheduler 308 and configured for storing security or clearance information. Such credentials services or security stores are commonly used with cloud services, and any such credential service may be used. Next, at a step 316, CPS credentials store 314 may send the user credentials back to multi-cloud resource scheduler 308 for validation of the user's credentials.

In some embodiments, multi-cloud resource scheduler 308 may couple with a hyperscaler API 318 to assist in triggering start and stop times of one or more instances. By way of non-limiting example, hyperscaler API 318 may be the Cloud Foundry Rest API. Although it will be appreciated that any hyperscaler API may be utilized. In some embodiments, hyperscaler API 318 may be paired with a user account and authentication (UAA) 320. In some embodiments, UAA 320 may comprise identity management features and identity-based security for hyperscaler API 318. For example, UAA 320 may comprise the credentials for users attempting to access hyperscaler API 318.

Accordingly, in some embodiments, at a step 322, a call from multi-cloud resource scheduler 308 to UAA 320 may occur, authenticating that the user has pre-approved authority or credentials to access hyperscaler API 318. After calling out to UAA 320, at a step 324, if the requesting user has the proper credentials or authority, UAA 320 may call back to multi-cloud resource scheduler 308 and send an access token or other proof of credentials. Next, at a step 326, while at the multi-cloud resource scheduler 308, a review of the transferred access token or other proof of credentials may occur.

Following the review of the access token or other proof of credentials, and if the requesting user has the proper authority of credentials, then at a step 328, instructions for the start time or shutdown time of one or more instances may occur. As described herein, the multi-cloud resource scheduler 308 may be used to establish the availability of one or more instances to users through defining a start time, shutdown time, and schedule of the one or more instances. Accordingly, at the multi-cloud resource scheduler 308 the requesting user may input instructions for the start time, shutdown time, and/or schedule of one or more instances. In some embodiments, the requesting user may input the instructions at multi-cloud resource scheduler 308 and the instructions may be sent to hyperscaler API 318. At a step 330, after receiving the instructions, hyperscaler API 318 may process and/or execute the instructions, including for example, which instances to apply the instructions to, and send a response back to multi-cloud resource scheduler 308. Following receipt of the response from hyperscaler API 318, at a step 332, multi-cloud resource scheduler 308 may send the response to CPS job scheduler 304, providing an indication of successful execution of the instructions.

Figure 4:
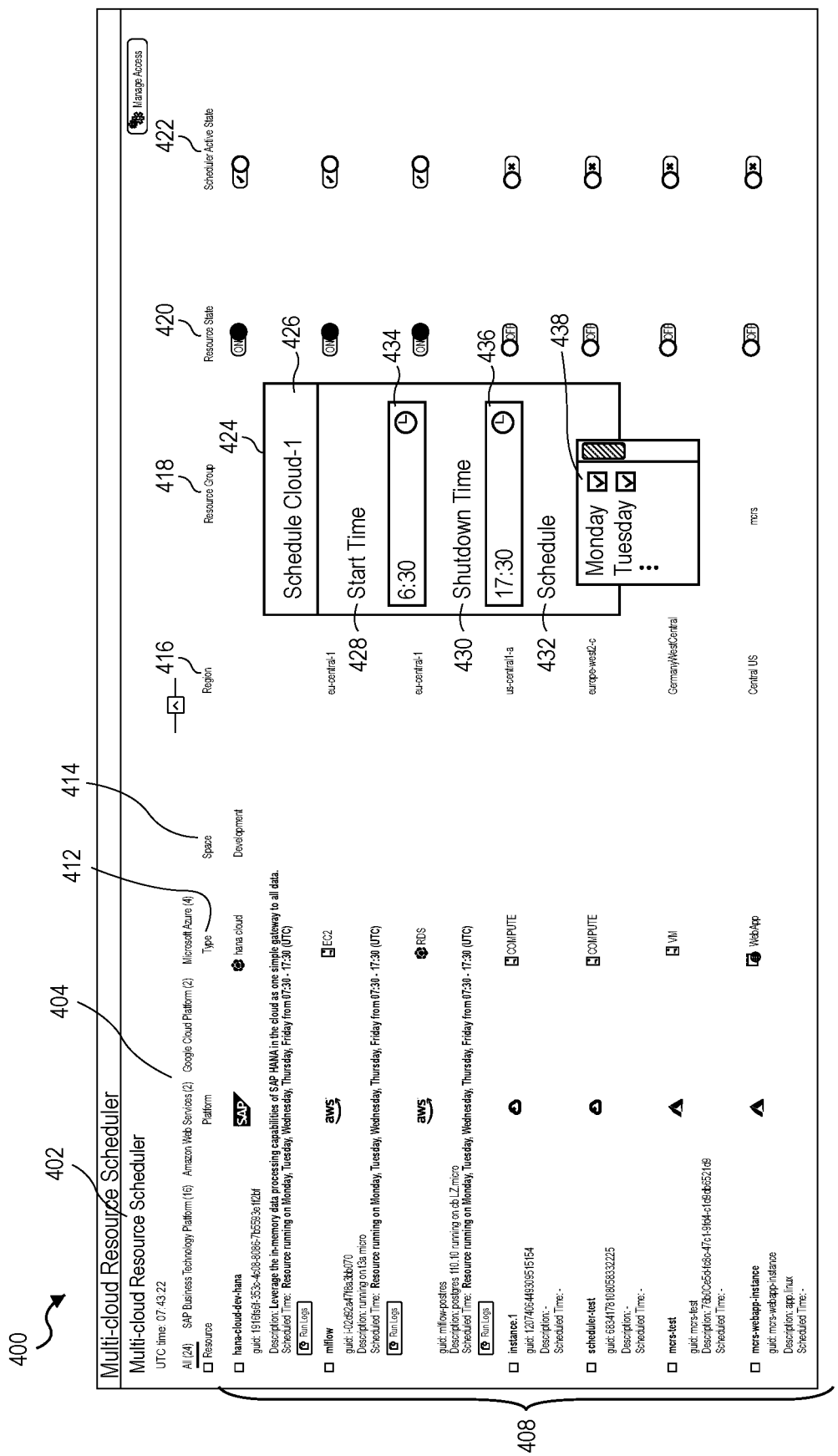
FIG. 4 is a graphical user interface of a multi-cloud resource scheduler in accordance with some embodiments.

Turning now to FIG. 4, an exemplary user interface of a multi-cloud resource scheduler is depicted and referred to generally as reference numeral 400. In some embodiments, user interface 400 may be used with multi-cloud resource scheduler 102 described above with respect to FIG. 1. User interface 400 may provide an administrator or other users a platform for entering commands and instructions for multi-cloud resource scheduler 102 for the scheduling of availability of one or more instances. In some embodiments, user interface 400 may comprise a multi-organizational structure, comprising panes, windows, tables, columns, toggles, and other organizational and operational features. For examples, in some embodiments user interface 400 may comprise an organization header 402 providing a description of a current job, such as multi-cloud resource scheduler. User interface 400 may further comprise an instance list 404 listing the total number of instances that are accessible by user interface 400 for setting parameters and instructions. Instance list 404 may provide a quick reference to the administrator for the total number of instances that are coupled to, or otherwise accessible by user interface 400. In some embodiments, instance list 404 may further provide the number of instances associated with a specific platform. For example, instance list 404 may display to a user that multi-cloud resource scheduler 102 is currently associated with 2 instances from Amazon AWS. As described in greater detail herein, a user may schedule instances at a platform bases, and accordingly, instance list 404 may provide a user with a reference as to the total number of instances are associated with specific platforms.

Further, user interface 400 may comprise a resource column 406, comprising a list of instances 408 that the administrator may assign permissions or instructions for. Instance 408 may be any of the instances described above with respect to FIGS. 1 and 2, and for example, may be hyperscaler instances or other online resources. As further illustrated, resource column 406 may comprise not only a listing of instances 408, but additional information associated with each instance 408. For example, resource column 406 may provide to an administrator a description of each instance 408 as well as scheduling information, including the start and shut-down time of the instance, computer power, a description of the purpose of the instance 408, among other information. In some embodiments, instances 408 may be added or removed from resource column 406, as new instances 408 are added to or removed from multi-cloud resource scheduler 102.

Furthermore, user interface 400 may further comprise a platform column 410, corresponding to each instance 408 in resource column 406. Platform column 410 may provide to the user text, a logo, or other identifying information indicative of the platform that each specific instance 408 belongs to. For example, an instance 408 from Amazon AWS may be indicated as such by an AWS logo in platform column 410. Platform column 410 may provide an administrator for a quick reference when searching for instances belonging to a particular platform. Additionally, user interface 400 may further comprise type column 412, providing to a user additional information about the instance 408. Many cloud-based platforms, such as Amazon AWS and GCP have more than one instances associated with the platform. For example, Amazon AWS has EC2 and RDS as specific instances. Accordingly, type column 412 may provide a user with text, logo, or other identifying information about an instance 408, allowing for a quick reference to distinguish between difference instances 408. Furthermore, user interface 400 may further comprise a space column 414, providing a quick reference to administrator 202 the current status of a particular instance, including for example, whether the instance is in development or is ready for production In some embodiments, user interface 400 may further comprise a region column 416 indicating which region or time zone that a particular instance 408 is deployed in. For example, some organizations or business operate on a global scale, and have users in many different regions, countries, or time zone. In some embodiments, instances 408 may be implemented, deployed, and used in specific regions or alternatively, may be deployed in more than one region. Accordingly, in some embodiments, instances 408 may be scheduled to start and shutdown based on regional factors, including but not limited to time zones, workdays, work hours, and holidays that may be region or county specific. For example, an instance 408 may be scheduled for operating in eu-central-1 region and may have a start and shutdown time established for that region's customs, practices, and/or requirements. Furthermore, in some embodiments, user interface 400 may further comprise a resource group column 418. In some embodiments, resource group column 418 may be used for providing the user information regarding with resource group that a particular instance belongs to. For example, resource group column 418 may provide an indication to a user that a particular instance 408 is associated with a Megaport Cloud Router.

In some embodiments, user interface 400 may further comprise a resource state column 420. In some embodiments, resource state column 420 may comprise toggles, buttons, or other methods of manually starting and shutting down specific instance 408 in resource column 406. Resource state column 420 may be used by a user for manually starting and shutting down specific instances 408. For example, each instance 408 may have a specific toggle associated with the instance 408 in resource state column 420 that the user may manually select. Furthermore, a user may manually start and shut down each instance in the instance list through resource state column 420. For example, at the end of the workday, an administrator may access user interface 400, and toggle each instance to "off" via resource state column. In further embodiments, resource state column 420 or user interface 400 may comprise a master toggle or button, wherein a user may selectively start or shutdown every instance 408 in resource column 406 in one action.

Optionally or additionally, user interface 400 may further comprise a scheduler active state column 422. In some embodiments, scheduler active state column 422 may comprise toggles, buttons, or other methods of setting one or more instances to scheduled start and shutdown times via multi-cloud resource scheduler 102. For example, in some embodiments, an administrator may establish a predetermined schedule of start and shutdown times for one or more instances 408, circumventing the need to manually start and shutdown each instance 408. As described in greater detail below, through user interface 400, multi-cloud resource scheduler 102 may receive instructions by a user, establishing predetermined start and shutdown times for one or more instances. Through scheduler active state column 422, a user may choose which instances are enabled or disabled to participate in the automated scheduled start and shutdown times. Accordingly, a user, via user interface 400, may selectively choose which instances 408 will participate in the scheduled start and shutdown times, and which instances may continue to be manually started and shutdown. For example, a user may select zero instances 408 to participate in the scheduled start and shutdown time process and continue to manually start and shutdown each instance 408. In further embodiments, an administrator may select all instances to participate in the automated process of scheduled start and shutdown times. In some embodiments, scheduler active state column 422 may comprise a master toggle or button for selecting each instance 408 to participate in scheduled start and shutdown times. The reasons for choosing whether to include an instance 408 to participate in the automated scheduled start and shutdown times may vary on a number of factors, and for example, may be dependent on the number of users needed to access the instances after working hours, the relative costs associated with keeping an instance running 24/7, fluctuating need times, among other factors.

Following the selection of one or more instances 408 to participate in the automated process of scheduled start and shutdown times, a user, via user interface 400, can establish the start and shutdown time for the selected instances. For example, following the selection of the one or more instances, a new display window 424 may be generated and displayed in user interface 400. In some embodiments, display window 424 may be generated and superimposed over a portion of user interface 400. Display window 424 may comprise a header pane 426, providing to user information indicative of the instances 408 that the user may set scheduled start and shutdown times for. For example, in some embodiments, a user may select one instance for scheduling a personalized start and shutdown times. Accordingly, in such an embodiment, header pane 426 may comprise the name of the instance 408 that is being defined with start and shutdown times. As a user selects more instances to be included in synchronizing to the same schedule of start and shutdown times, header pane 426 may comprise other indicating information, including but not limited to a project name, a region, an office, a platform, or other identifying information.

Display window 424 may further comprise additional components, panes, or text boxes for a user to define the start time 428, the shutdown time 430, and a schedule 432 of one or more instances 408. In some embodiments, display window 424 may comprise a start time command pane 434 allowing an administrator to input start time 428 for the selected instances 408. In some embodiments start time command pane 434 may be a text box, allowing a user to manually enter start time 428 for the selected instances 408, and upon execution, activate the selected instance 408 at the entered start time 428. In further embodiments, start time command pane 434 may comprise a drop-down menu, populated with pre-determined time intervals for selecting the start time 428 of the selected instances 408. For example, in some embodiments, time intervals of about fifteen minutes may be selected for potential start times 428.

In some embodiments, shutdown time 430 may also comprise a shutdown time command pane 436, which may be designed similarly to start time command pane 434, allowing a user to enter shutdown time 430 for the selected instances. Like the start time command pane, shutdown time command pane 436 may comprise a text box, or alternatively, a drop-down menu populated with pre-determined time intervals. Through shutdown time command pane 436, a user may therefore enter the time at which the selected instances 408 will shut down. Accordingly, through display window 424 and through entering start time 428 and shutdown time 430, a user may enter a timeframe or time-period that selected instances 408 are available for use by other users. In some embodiments, display window 424 may be connected to region column 416, to account for different time zones when setting start times 428 and shutdown times 430. Accordingly, the scheduled start times 428 and shutdown times 430 may be automatically adjusted to correspond to the time zone of the region the selected instance 408 is deployed in. Through the selective granularity of scheduler active state column 422 and the option to select specific instances 408, a user accessing user interface 400 is afforded the option to customize the availability of all instances 408 connected to multi-cloud resource scheduler 102.

Furthermore, in some circumstances or scenarios, instances 408 may require different availabilities on different days of the week. For example, in a typical United States work-place setting, the work week is Monday through Friday, with Saturdays and Sundays designated as non-workdays. However, other regions may not adhere to the United States schedule. Furthermore, in certain workplaces or settings, some workdays may correspond to an influx of new work or may correspond to deadlines for sending out work product. Accordingly, in addition to establishing a start time 428 and shutdown time 430, a user may further define specific start times 428 and shutdown times 430 for specific days of the week. Therefore, in some embodiments, display window 424 may further comprise a scheduling pane 438 for entering in schedule 432 of selected instances 408. For example, in some embodiments, scheduling pane 438 may comprise a text box, allowing a user to manually enter selected days to correspond to start time 428 and shutdown time 430. In further embodiments, start time command pane 434 may be a drop-down menu, populated with pre-determined, days (i.e., Monday, Tuesday, etc. or weekdays) for selecting the days to schedule start time 428 and shutdown time 430. Accordingly, a recurring schedule such as schedule 432 may comprise non-uniform or otherwise varying start times 428 and shutdown times 430. In addition to selecting days of the week for schedule 432, scheduling pane 438 may further comprise additional options for defining schedule 432. For example, a user may schedule all instances 408 for an office or region to remain shut down on recognized holidays, such as Memorial Day in the United States or Labor Day in Germany.

In some embodiments, through user interface 400 users, typically administrators, may monitor other users' use of the instances 408, for determining whether to adjust the scheduled start times 428, shutdown times 430, and schedule 432, or any combination thereof. Such monitoring may result in concrete resource utilization metrics. Through such monitoring, an administrator may see patterns in access and use of instances, and adjust the start time 428, shutdown time 430, schedule 432, or any combination thereof, based at least in part on the observed patterns. Furthermore, in some embodiments, a machine learning algorithm may be implemented for monitoring users' use of the instances and automatically adjust the start time 428, shutdown time 430, schedule 432, or any combination thereof of the instances 408 based on corresponding utilization metrics. For example, in some embodiments, an administrator may establish a shutdown time 430 for an instance at 1700 hours (i.e., 5:00 p.m.). However, through monitoring of users' access and use of the instance 408, the machine learning algorithm may confirm a deduction that that all users accessing an instance with this shutdown time 430 stop using the instance at 1630 hours (i.e., 4:30 pm). Accordingly, the machine learning algorithm may utilize such a confirmation to cause a modification to the schedule of the instance 408 and establish a shutdown time 430 of 1630 hours (i.e., 6:30 p.m.). In some embodiments, the machine learning algorithm may be trained to monitor activity for all instances associated with multi-cloud resource scheduler 102, and adjust the start time 428, shutdown time 430, schedule 432, or any combination for any and all instances.

In some embodiments, a user accessing user interface 400 may provide additional instructions when scheduling instances 408 to account for individual user's needs. For example, the scheduling of instances 408 may be entered at a macro level, affecting users at an organization level or other large grouping, such as by regions. While a user may choose the start time 428, shutdown time 430, and schedule of one or more instances 408 to account for the needs of the majority of users, exceptions invariably may arise. For example, a user working after normal business hours to finish a project before a deadline may require access to an instance 408 with a shutdown time 430 at the close-of-business, (i.e., 1700 hours). Accordingly, multi-cloud resource scheduler 102 may comprise methods for allowing administrators or other users to enter overrides for users to circumvent the scheduled start time 428 and shutdown time 430 of instances 408.

For example, in some embodiments, if a user is using an instance 408 at the scheduled shutdown time 430, rather than the instance 408 shutting down, a notification may be generated and sent to the user, informing the user that the instance 408 is beyond the scheduled shutdown time 430. The notification may further comprise an option for the user to either select to shut down the instance 408 or to continue using the instance 408 beyond the scheduled shutdown time 430, such as a clickable button. In some embodiments, following the user's choice to continue to use the instance 408 after the scheduled shutdown time 430, the user may continue to use the instance 408 without further notifications. In further embodiments, notifications may be sent at pre-determined intervals, requiring the user to reaffirm that the user is still using the instance 408. In some embodiments, if a user does not reaffirm that they are still using the instance 408, after a predetermined time period has passed, multi-cloud resource scheduler 102 may shut down the instance 408. In further embodiments, multi-cloud resource scheduler 102 may monitor the user's use of the instance 408, and when the user terminates use of the instance 408, then multi-cloud resource scheduler 102 may shutdown the instance 408 and resume the instance 408 at the next scheduled start time 428. In some embodiments, a user may attempt to access an instance 408 after the instance 408 has already been shut down due to a scheduled shutdown time 430. In some embodiments, the user may nevertheless access the instance 408. In some embodiments, a user may be required to submit a request to an administrator or other authority to request approval to access the instance 408 after the scheduled shutdown time 430. In other embodiments, a request may not be needed and an instance 408 may be started and made available for the requesting user.

In some embodiments, users' access and use of instances 408 may be monitored and stored for analytics purposes. For example, in some embodiments, users' access and use of instances 408, including when users are accessing the instances 408 may be used for refining the scheduled start time 428, shutdown time 430, schedule 432, or any combination thereof for the instances 408. Such tracking of use may be particularly useful for teaching a machine learning algorithm for modifying start time 428, shutdown time 430, schedule 432, or any combination thereof for the instances 408. Such tracking may also be beneficial for internal business purpose, illustrating which instances 408 are being used with regularity, and whether the costs of running the instances 408 are cost-effective.

Furthermore, in some embodiments, multi-cloud resource scheduler 102 may be connected to users' client devices and may be granted permissions to access certain features and functions of the client devices. For example, multi-cloud resource scheduler 102 may be granted access to the calendar or meetings application stored on a client device. Through such access to a user's calendar, an administrator or a machine learning algorithm may make adjustments to the scheduled start time 428 and/or shutdown time 430 of an instance 408 for specific users. For example, if a user has a meeting scheduled at 1900 hours which requires the use of a Microsoft Azure instance, and the scheduled shutdown time 430 of the Microsoft Azure instance is at 1830 hours, the administrator or machine learning algorithm, after reviewing the user's calendar, may make the Microsoft Azure instance available for that user after the scheduled shutdown time 430. Access to a user's client device may further be useful when adjusting for travel that takes a user from one region or time zone to another. Through access to the user's client device, the change in time zone or region may be automatically tracked and adjusted, aiding in maintaining uninterrupted access to the instances 408.

Figure 5:
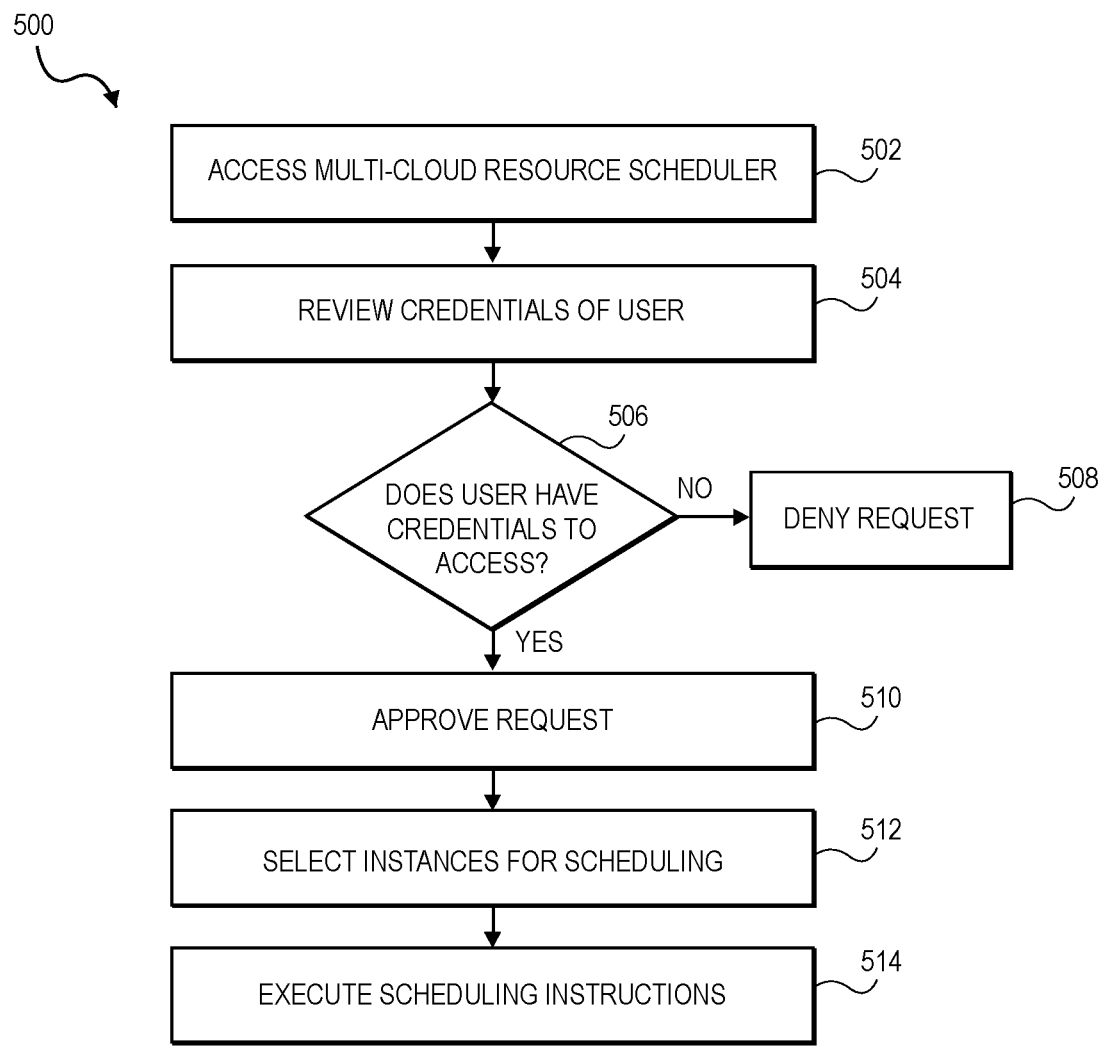
FIG. 5 is an exemplary flowchart illustrating a method of scheduling a start time and a shutdown time for an instance in accordance with certain embodiments.

Turning now to FIG. 5, a method of carrying out embodiments is depicted and referred as reference numeral 500. In some embodiments, at step 502, a user may attempt to access the user interface of a multi-cloud resource scheduler. The user may be an administrator or other user having pre-approved credentials, such as those that have been described above. The user may submit a request to access the user interface of the multi-cloud resource scheduler through a device, including but not limited to a desktop, laptop, or other hardware that is capable of displaying and running the user interface of the multi-cloud resource scheduler. In some embodiments, the multi-cloud resource scheduler may be multi-cloud resource scheduler 102 as described herein, which is connected to at least one hyperscale instance and which may selectively apply a start time and shutdown time for the at least one hyperscale instance.

Next, at a step 504, responsive to the request to access the multi-cloud resource scheduler, a review of the credentials of the user may be performed. In some embodiments, the multi-cloud resource scheduler may define the accessibility of one or more instances for a plurality of users, and accordingly, the multi-cloud resource scheduler may not be accessible by all users. Therefore, in some embodiments, the multi-cloud resource scheduler may review the credentials of the requesting user. In some embodiments, the credentials of the requesting user may be accessible to the multi-cloud resource scheduler through connection to a credentials store, communicatively coupled to multi-cloud resource scheduler.

Next, a test 506 may occur, and a determination may be made as to whether the requesting user has pre-approved authority or credentials to access the multi-cloud resource scheduler. In some embodiments, if test 506 determines that the requesting user does not have pre-approved credentials or is otherwise not authorized to access the multi-cloud resource scheduler, then at step 508 the requesting user will be denied access to the multi-cloud resource scheduler. If test 506 determines that the requesting user does have pre-approved credentials or is otherwise authorized to access multi-cloud resource scheduler, then at a step 510 the requester user will be granted access to the multi-cloud resource scheduler.

Following approval to access the multi-cloud resource scheduler, step 512 may occur. At step 512 the user may select one or more instances associated with the multi-cloud resource scheduler for establishing a start time, a shutdown time, a schedule for start times and shutdown times, or any combination thereof. In some embodiments, the user may schedule a start time, a shutdown time, and a schedule for any or all instances associated with the multi-cloud resource scheduler. In some embodiments, the user may input the instructions for each instance through a user interface associated with the multi-cloud resource scheduler.

Finally, at a step 514, following instructions from the user, the selected instances may be made available to at least one other user. For example, at step 512 the user may instruct a particular instance to have a start time at 0630 hours, a shutdown time at 1930 hours and a schedule providing that the start times and shutdown times are effective from Monday through Friday. During that time, a second user may access the instance from a client device.

In some embodiments, steps 502 through 514 may be repeated indefinitely, establishing a start time, shutdown time, schedule, or combination thereof for any and all instances associated with the multi-cloud resource scheduler. In further embodiments, steps 502 through 514 may be performed by a machine learning algorithm or other automated means. For example, over time, review of user's use of the instances may prompt either the user or the machine learning algorithm to alter the start time, shutdown time, and/or schedule of an instance, based at least in part on user's use of the instance.

Figure 6:
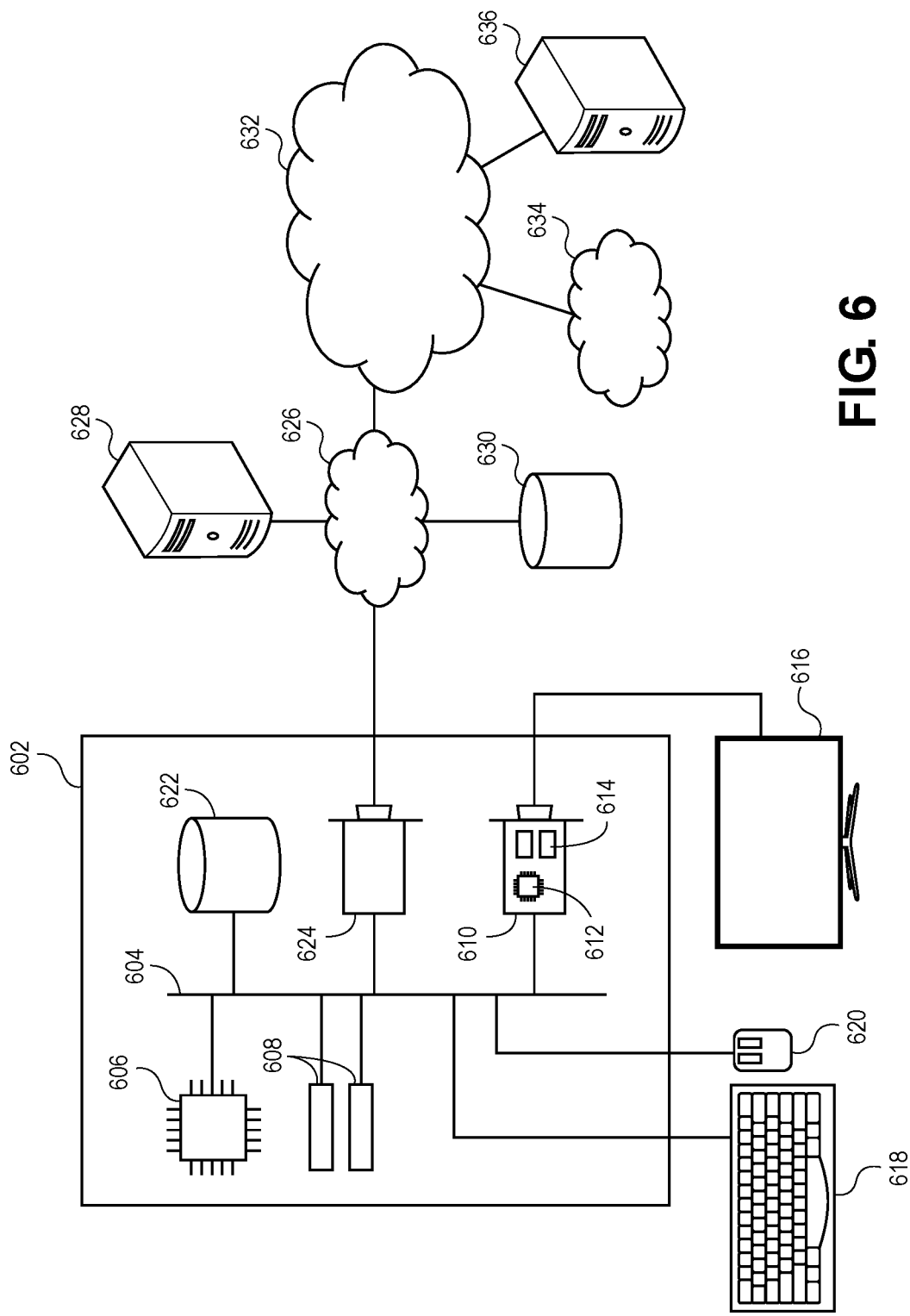
FIG. 6 is an exemplary hardware platform for certain embodiments.

Turning now to FIG. 6, an apparatus comprising exemplary hardware platform for certain embodiments is depicted. Computer 602 can be a desktop computer, a laptop computer, a server computer, a mobile device such as a smartphone or tablet, or any other form factor of general- or special-purpose computing device. Depicted with computer 602 are several components, for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components may communicate with each other directly. Connected to system bus 604 is central processing unit (CPU) 606. Also attached to system bus 604 are one or more random-access memory (RAM) modules 608. Also attached to system bus 604 is graphics card 610. In some embodiments, graphics card 610 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media and may be internally installed in computer 602 or externally and removably attached.

Such non-transitory, computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the IEEE 802.11 family of standards). NIC 624 connects computer 602 to local network 626, which may also include one or more other computers, such as computer 628, and network storage, such as data store 630. Generally, a data store such as data store 630 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 628, accessible on a local network such as local network 626, or remotely accessible over Internet 632. Local network 626 is in turn connected to Internet 632, which connects many networks such as local network 626, remote network 634 or directly attached computers such as computer 636. In some embodiments, computer 602 can itself be directly connected to Internet 632.

In some embodiments, any of the components described with respect to FIG. 6 may be included in the system 100. For example, embodiments are contemplated where the computer 602 may be used to interact with the system 100. Accordingly, the user interface 400 may be generated for display on the display 616. Further, any of the components of system 100 communicate over a network such as local network 626 or over the internet 632. Additionally, any of the functionality described with respect to various embodiments may be carried out using a server computer including any of the hardware described with respect to computer 602.

Although the disclosure has been described with reference to the embodiments illustrated in the attached drawing figures, it is noted that equivalents may be employed, and substitutions made herein without departing from the scope of the disclosure as recited in the claims.

Having thus described various embodiments of the disclosure, what is claimed as new and desired to be protected by Letters Patent includes the following:

1. One or more non-transitory computer-readable media storing computer-executable instructions that, when executed by a processor, perform a method for scheduling a start time and a shutdown time of one or more online resources associated with a multi-cloud resource scheduler, the method comprising:
   receiving, a request from a first user to access a multi-cloud resource scheduler,
      wherein the multi-cloud resource scheduler is connected to one or more online resources;
   responsive to the request from the first user, validating credentials of the first user to access the multi-cloud resource scheduler,
   based upon the validating of the credentials of the first user, providing, to the first user, access to the multi-cloud resource scheduler;
   receiving instructions from the first user to schedule the start time and the shutdown time of at least one online cloud resource associated with the multi-cloud resource scheduler;
   based on the instructions, establishing an availability of the at least one online cloud resource for access by a second user; and
   responsive to the second user accessing the at least one online cloud resource after the shutdown time, sending a notification to the second user after a pre-determined time period requesting confirmation that the second user is still accessing the at least one online cloud resource.

2. The non-transitory computer-readable media of claim 1, the method further comprising:
   receiving, from the first user, a configuration parameter indicating that the start time and the shutdown time are selectively disabled.

3. The non-transitory computer-readable media of claim 1, the method further comprising:
   scheduling a recurring start time and a recurring shutdown time of the at least one online cloud resource.

4. The non-transitory computer-readable media of claim 1, the method further comprising:
   receiving resource utilization metrics regarding utilization by the second user of the at least one online cloud resource.

5. The non-transitory computer-readable media of claim 4, the method further comprising:
   adjusting at least one of the start time or the shutdown time of the at least one online cloud resource based at least in part on the resource utilization metrics.

6. The non-transitory computer-readable media of claim 1, the method further comprising:
   scheduling a synchronized start time and a synchronized shutdown time of a plurality of online cloud resources, wherein each online cloud resource in the plurality of online cloud resources has a start time and a shutdown time that are mutually synchronized.

7. The non-transitory computer-readable media of claim 1, the method further comprising:
scheduling a start time and a shutdown time of a plurality of online cloud resources, wherein at least one online cloud resource within the plurality of online cloud resources comprises a different start time or a different shutdown time than at least one other online cloud resource within the plurality of online cloud resources.

8. A method for scheduling a start time and shutdown time for an online cloud resource associated with a multi-cloud resource scheduler, the method comprising:
receiving, through a user interface, a request from a first user to access a multi-cloud resource scheduler,
wherein the multi-cloud resource scheduler is connected to an online cloud resource;
granting, to the first user, access to the multi-cloud resource scheduler;
receiving, through the user interface, instructions from the first user to establish a start time and a shutdown time of the online cloud resource connected to the multi-cloud resource scheduler;
based on the instructions, establishing an availability of the online cloud resource for access by a second user; and
responsive to the second user accessing the online cloud resource after the shutdown time, sending a notification to the second user after a pre-determined time period requesting confirmation that the second user is still accessing the online cloud resource.

9. The method of claim 8, further comprising receiving instructions from the first user to allow the second user to access the online cloud resource after a scheduled shutdown time.

10. The method of claim 8, wherein the multi-cloud resource scheduler is configured to access a client device of the second user.

11. The method of claim 10, further wherein the start time and the shutdown time of the online cloud resource are automatically adjusted for time zones.

12. The method of claim 10, further comprising reviewing a calendar or meeting schedule stored in a memory of the client device and adjusting either of a scheduled start time or a scheduled shutdown time based at least in part on the reviewing.

13. The method of claim 10, further comprising reviewing a credentials of the second user to determine if the second user is authorized to access the online cloud resource.

14. A system comprising at least one processor and at least one non-transitory memory storing computer executable instruction that when executed by the processor cause the system to carry out actions comprising:
receiving, through a user interface, a request from a first user to access a multi-cloud resource scheduler,
wherein the multi-cloud resource scheduler is connected to at least one online cloud resource;
responsive to the request from the first user, validating credentials of the first user to access the multi-cloud resource scheduler,
based upon the validating of the credentials of the first user, providing access to the multi-cloud resource scheduler to the first user;
receiving, through the user interface, instruction from the first user to establish a recurring start time and a recurring shutdown time of the at least one online cloud resource connected to the multi-cloud resource scheduler; and
based on the instructions, establishing an availability of the at least one online cloud resource for access by a second user; and
responsive to the second user accessing the at least one online cloud resource after the shutdown time, sending a notification to the second user after a pre-determined time period requesting confirmation that the second user is still accessing the at least one online cloud resource.

15. The system of claim 14, wherein additional online cloud resources may be added to the multi-cloud resource scheduler and online cloud resources may be removed from the multi-cloud resource scheduler.

16. The system of claim 14, further comprising an apparatus for monitoring use of the at least one online cloud resource by the second user.

17. The system of claim 14, wherein the at least one online cloud resource is a hyperscaler instance.

18. The system of claim 14, the actions further comprising:
receiving resource utilization metrics regarding utilization by the second user of the at least one online cloud resource; and
adjusting the recurring start time based at least in part on the resource utilization metrics.

19. The system of claim 14, the actions further comprising:
receiving resource utilization metrics regarding utilization by the second user of the at least one online cloud resource; and
adjusting the recurring shutdown time based at least in part on the resource utilization metrics.

* * * * *